United States Patent
Xu et al.

(10) Patent No.: US 10,812,181 B2
(45) Date of Patent: Oct. 20, 2020

(54) LIGHT SOURCE REDUNDANCY IN OPTICAL COMMUNICATION DEVICES

(71) Applicant: Finisar Corporation, Sunnyvale, CA (US)

(72) Inventors: Xiaojie Xu, Pleasanton, CA (US); Bernd Huebner, Mountain View, CA (US); Rafik Ward, Menlo Park, CA (US); Martin Huibert Kwakernaak, Fremont, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/193,892

(22) Filed: Nov. 16, 2018

(65) Prior Publication Data

US 2020/0162153 A1    May 21, 2020

(51) Int. Cl.
*H04B 10/032* (2013.01)
*H04B 10/079* (2013.01)
*H04B 10/50* (2013.01)

(52) U.S. Cl.
CPC ..... *H04B 10/032* (2013.01); *H04B 10/07955* (2013.01); *H04B 10/503* (2013.01)

(58) Field of Classification Search
CPC ................ H04B 10/032; H04B 10/503; H04B 10/07955; H04B 10/506; H04B 10/40; H04J 14/02
See application file for complete search history.

(56) References Cited

U.S. PATENT DOCUMENTS

| | | | |
|---|---|---|---|
| 7,200,296 B2 | 4/2007 | Kish, Jr. et al. | |
| 8,699,871 B2 | 4/2014 | Tosetti et al. | |
| 9,847,840 B2 | 12/2017 | Xu et al. | |
| 2003/0011851 A1* | 1/2003 | Trezza | G02B 6/4204 398/141 |
| 2003/0095737 A1* | 5/2003 | Welch | B82Y 20/00 385/14 |
| 2017/0219783 A1* | 8/2017 | Zhang | H01S 5/0228 |
| 2018/0083417 A1 | 3/2018 | Pezeshki et al. | |
| 2018/0183513 A1 | 6/2018 | Levesque et al. | |

OTHER PUBLICATIONS

International Search Report and Written Opinion dated Mar. 12, 2020, in related PCT Application No. PCT/US2019/061744 (13 pages).

* cited by examiner

*Primary Examiner* — Leslie C Pascal
(74) *Attorney, Agent, or Firm* — Maschoff Brennan

(57) ABSTRACT

An embodiment includes an optical transmitter. An optical transmitter may include a primary laser for transmitting a primary optical signal and a backup laser for transmitting a backup optical signal. The optical transmitter may further include a photonic integrated circuit (PIC). The PIC may include at least one input port configured to receive the primary optical signal from the primary laser and the backup optical signal from the backup laser. The PIC may also include at least one output port configured to receive each of the primary optical signal and the backup optical signal. The optical transmitter may be configured to activate the backup laser upon determining that the primary laser has failed or is failing.

15 Claims, 7 Drawing Sheets

LIGHT SOURCE REDUNDANCY IN OPTICAL COMMUNICATION DEVICES

FIELD

The embodiments discussed herein are related to optical communication. In particular, some embodiments relate to optical transmitters with one or more redundant light sources.

BACKGROUND

High speed data transmission is becoming more and more critical as the amount of data communicated via communication networks increases. High speed data transmission networks may rely on optical transceivers (e.g., optical transmitters and/or receivers) for facilitating transmission and reception of digital data in the form of optical signals over optical fibers. Optical networks are thus found in a wide variety of high speed applications ranging from modest local area networks ("LANs") to larger networks, such as the Internet. Silicon photonics technology has emerged as a technology for meeting the ever increasing demands on higher speed and higher density for the fiber optical communications.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes an optical transmitter. The optical transmitter may include a primary laser for transmitting a primary optical signal. The optical transmitter may further include a backup laser for transmitting a backup optical signal. Also, the optical transmitter may include a photonic integrated circuit (PIC). The PIC may include at least one input port configured to receive the primary optical signal from the primary laser and the backup optical signal from the backup laser. The PIC may also include at least one output port configured to receive each of the primary optical signal and the backup optical signal. The optical transmitter may be configured to activate the backup laser upon determining that the primary laser has failed or is failing.

Another example embodiment includes an optical transmitter. The optical transmitter may include at least one input port configured to receive a first optical signal from a first laser and a second optical signal from a second laser. The optical transmitter may also include at least one output port configured to receive the first optical signal while the first laser is activated, and receive the second optical signal while the second laser is activated. The optical transmitter may be configured to sense an optical power level of the first optical signal. The optical transmitter may also be configured to activate the second laser in response to the optical power level of the first optical signal being below a threshold value.

According to another embodiment, the present disclosure includes methods for operating an optical transmitter. Various embodiments of such a method may include transmitting, from a first laser, a first optical signal within an optical transmitter. The method may also include determining if the first laser has failed or is failing. Further, the method may include activating a second laser in response to determining that the first laser has failed or is failing. The method may further include deactivating the first laser in response to determining that the first laser has failed or is failing. In addition, the method may include transmitting, from the second laser, a second optical signal within the optical transmitter.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Figure 1:
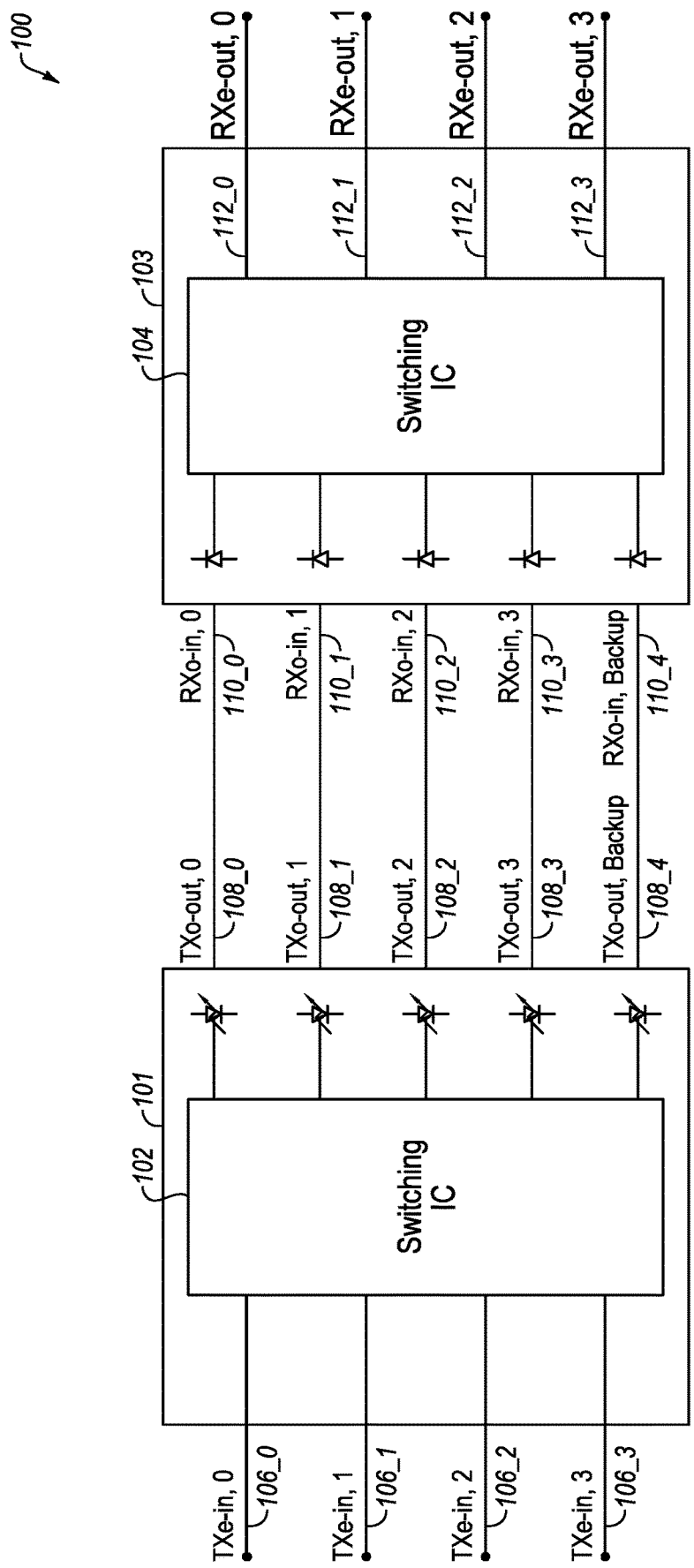
FIG. 1 depicts an optical transceiver with a redundant channel.

Optical transceivers may include an input receiver optical subassembly ("ROSA") and an output transmitter optical subassembly ("TOSA"). The ROSA may include a photodiode or other optical detector for detecting optical signals and sensing circuitry for converting the optical signals to electrical signals compatible with other network components. The TOSA may include a laser or other suitable light source for transmitting optical signals and may further include control circuitry for modulating the laser according to an input digital data signal and a photodetector to monitor laser power.

Silicon photonics technology has emerged as a technology to meet the ever increasing demands on higher speed and higher density for fiber optical communications. However, higher speed and/or higher density may result in reliability issues (e.g., for a laser), as an optical transceiver module may be operating constantly at elevated temperatures (e.g., 70 to 90 degrees Celsius) and high laser bias currents. For example, the failure rate for an optical transceiver may be as high as a few percent per year for a typical continuous wave (CW) distributed feedback (DFB) laser operating constantly at, for example, approximately 85 to 90 degrees Celsius with an output power of, for example, approximately 40 to 100 milliwatts (mW).

Some embodiments of the present disclosure relate to optical transmitters including light source (e.g., laser) redundancy. For example, in some embodiments, an optical transmitter may include a plurality of light sources, such as for example, one or more primary lights sources and one or more backup light sources. Further, in some embodiments, an optical transmitter may include a dual strip light source device including a plurality of light sources configured to share components (e.g., coupling optics) (e.g., to reduce the foot print and cost).

Redundancy may greatly reduce laser failure rate. For example, a laser with a 1% failure rate per year may be considered to be very poor. By simply adding a redundant laser, the failure rate may be reduced to, for example, 100 parts per million (ppm) (e.g., a 100× improvement). Similar reduction of wear out failure may also occur.

According to some embodiments, one or more optical transmitters and/or transceivers described herein may include a Mach-Zehnder optical modulator (MZM) based silicon photonic transceiver and/or a parallel transceiver module. MZM based silicon photonic transceivers and/or parallel transceiver modules may be relatively easy to implement and may not need a sophisticated switching integrated circuit (IC) for both transmit and receive. In silicon photonic applications, when one light source starts to fail, the failure may be detected by a monitoring photodiode (MPD) on a silicon photonic integrated circuit (PIC), and the module may simply deactivate ("turn-off") the failing light source (e.g., continuous wave (CW) laser) and activate ("turn-on") a backup light source (e.g., a backup CW laser). In some embodiments, there may be a brief disruption in data traffic (e.g., in the millisecond range) while switching from one light source to another light source.

Various embodiments of the present disclosure may be implemented at low cost, as stringent requirements on laser reliability associated with high temperature and high power applications may be reduced or eliminated. Various embodiments may reduce the costs of an optical transceiver and may eliminate a requirement for an expensive laser burn-in.

Some additional details of these and other embodiments are described with reference to the appended figures. In the appended figures, structures and features with the same item numbers are substantially the same unless indicated otherwise.

FIG. 1 depicts a system 100 that includes an optical transmitter (left side of FIG. 1) and an optical receiver (right side of FIG. 1) with a redundant channel therebetween. More specifically, the system 100 includes a four-channel parallel optical transmitter and a four-channel parallel optical receiver. On a transmit side (e.g., a transmitter) 101, the system 100 includes multiple input transmit lines 106_0, 106_1, 106_2, and 106_3 (collectively "input transmit lines 106"), a switching IC 102 (e.g., a 4-to-5 switching IC), and multiple output transmit lines 108_0, 108_1, 108_2, 108_3, and 108_4 (collectively "output transmit lines 108"). In this example, there are four input transmit lines 106 and five output transmit lines 108 such that one of the output transmit lines 108 may be redundant. As an example, the output transmit line 108_4 may be redundant. Upon failure of any one of the output transmit lines 108, such as the output transmit line 108_0, the switching IC 102 may turn off the failed output transmit line (e.g., 108_0) and route a signal to the redundant output transmit line (e.g., 108_4 in this example).

On a receive side (e.g., a receiver) 103, the system 100 includes multiple input receive lines 110_0, 110_1, 110_2, 110_3, 110_4 (collectively "input receive lines 110"), a switching IC 104 (e.g., a 5-to-4 switching IC), and multiple output receive lines 112_0, 112_1, 112_2, 112_3 (collectively "output receive lines 112"). In this example, there are five input receive lines 110 and four output receive lines 112 such that one of the input receive lines 110 may be redundant. As an example, the input receive line 110_4 may be redundant. Upon failure of any one of the input receive lines 110, such as the input receive line 110_1, the switching IC 104 may turn off the failed input receive line (e.g., 110_1) and route the signal to the redundant input receive line (e.g., 110_4 in this example). In this embodiment, a signal path (e.g., the physical route) taken by a signal between the transmitter 101 and the receiver 103 (or between a first transceiver that includes the transmitter 101 and a second transceiver that includes the receiver 103) is changed. Stated another way, upon failure of a channel, a signal is routed via a different route or channel between the transmitter 101 and the receiver 103, or between transceivers that include the transmitter 101 and the receiver 103. Utilizing switching in high-speed data applications (e.g., via switching ICs) may be challenging.

Figure 2:
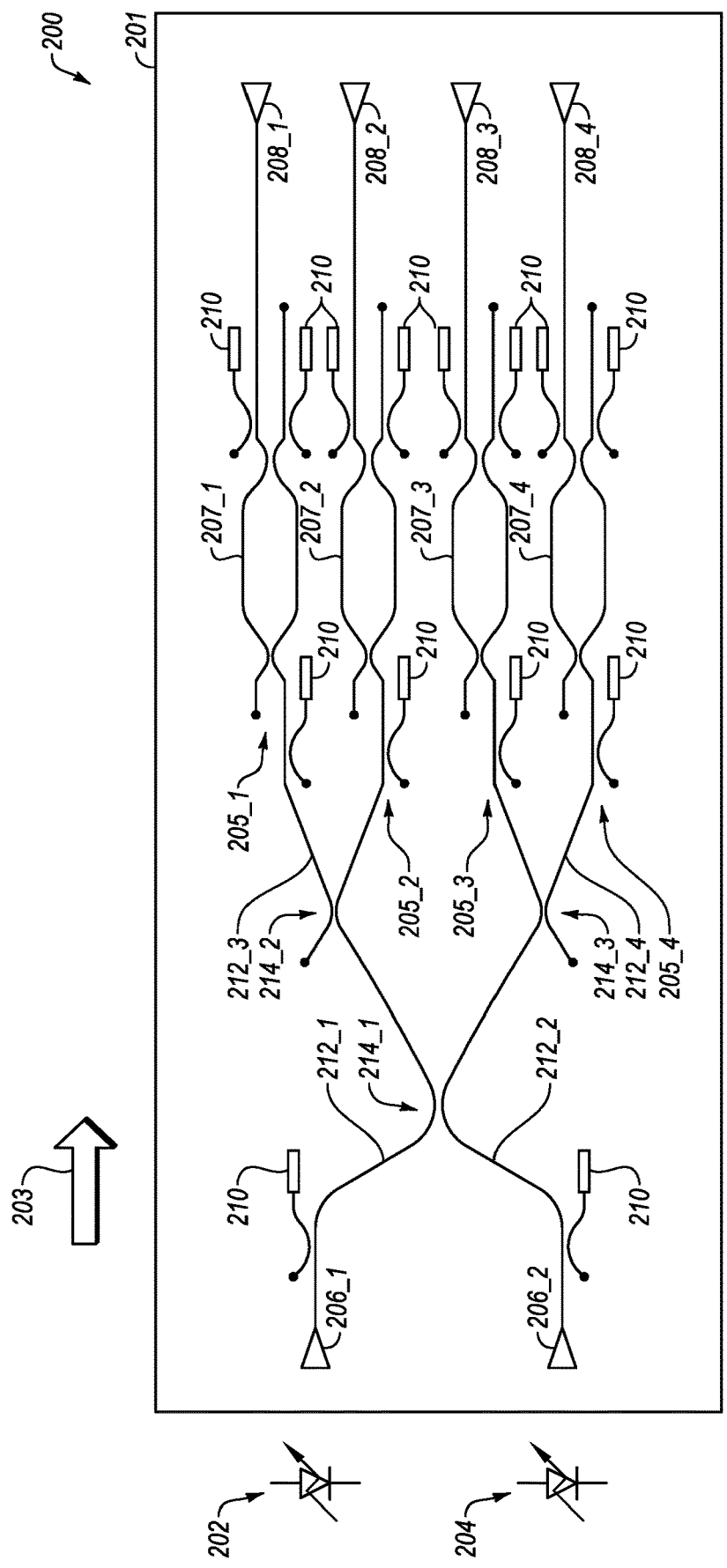
FIG. 2 illustrates an optical transmitter including a plurality of light sources, according to various embodiments of the present disclosure.

FIG. 2 illustrates an optical transmitter 200 (hereinafter "transmitter 200") including a plurality of light sources, according to various embodiments of the present disclosure. In accordance with various embodiments, the transmitter 200 may include one light source (e.g., a CW laser) and a redundant light source (e.g., another CW laser), which may improve the reliability of the transmitter 200. Further, for example, the transmitter 200 may be part of a four channel silicon photonic based parallel optical transceiver module with two lights sources (e.g., two lasers).

As illustrated, the transmitter 200 may include a photonic integrated circuit (PIC) 201. The transmitter 200 further includes a first light source (e.g., a primary laser) 202 and at least one additional light source (e.g., a backup laser) 204. The light sources 202 and 204 may each include any suitable light source, such as a light emitting diode or a laser diode. Further, the transmitter 200 includes inputs 206 (e.g., input 206_1 associated with light source 202 and input 206_2 associated with light source 204). Each of the inputs 206 may include a grating coupler or other suitable coupler. In addition, the transmitter 200 includes modulators (e.g., MZMs) 207, sensors 210, outputs 208 (e.g., outputs 208_1, 208_2, 208_3 and 208_4). Sensors 210 may be configured for sensing light or other electromagnetic energy propagating through transmitter 200. For example, each sensor 210 may include at least one photodiode, a test access point (TAP), a combination thereof, or any another photosensitive device to monitor the power of signal generated via an active laser.

In a contemplated operation of the transmitter 200, each light source 202, 204, when activated and/or turned on, may emit a CW signal, which is coupled into the PIC 201, e.g., via a corresponding one of the inputs 206. In general, only one of the light sources 202, 204 will be turned on and/or activated at any given time. Moreover, when turned on and/or activated, neither of the light sources 202, 204 is modulated; rather, a portion of the CW signal emitted by the corresponding light source 202, 204 is modulated by each of the MZMs 207 to generate four distinct modulated outputs, as described in more detail below.

From a given one of the inputs 206, the CW signal then propagates through the PIC 201, generally in the direction denoted at 203 (hereinafter "light propagation direction 203"), e.g., through various waveguides formed in the PIC 201. For example, if the light source 202 is turned on and/or activated, the light source 202 emits the CW signal which is coupled into the PIC 201 via the input 206_1, and the CW signal then propagates on a waveguide 212_1. Analogously, if the light source 204 is turned on and/or activated, the light source 204 emits the CW signal which is coupled into the PIC 201 via the input 206_2, and the CW signal then propagates on a waveguide 212_2.

Thereafter, the CW signal may be split into four different portions which may be directed through four different channels or arms 205_1, 205_2, 205_3, 205_4 (hereinafter "arms 205"), where each of the arms 205 includes a corresponding one of the MZMs 207 and each of the MZMs 207 includes an interferometer with two arms. In particular, the CW signal, whether received from the light source 202 via the input 206_1 and the waveguide 212_1 or from the light source 204 via the input 206_2 and the waveguide 212_2, may first be split in two, e.g., into two substantially equal portions, at a first coupler 214_1 formed by bringing the two waveguides 212_1, 212_2 sufficiently close together for a mode of the CW signal to spread into both of the waveguides 212_1, 212_2. Following the first coupler 214_1, the two portions of the CW signal propagating in the waveguides 212_1, 212_2 are each split again, e.g., into two substantially equal portions, at second and third couplers 214_2, 214_3. Following the second and third couplers 214_2, 214_3 in the light propagation direction 203, approximately a quarter of the CW signal may be propagating on each of a waveguide 214_3, the waveguide 212_1, the waveguide 212_2, and a waveguide 212_4 (collectively "waveguides 212") in a corresponding one of the arms 205. The MZM 207_1 is optically coupled to the waveguide 212_3, the MZM 207_2 is optically coupled to the waveguide 212_2, the MZM 207_3 is optically coupled to the waveguide 212_2, and the MZM 207_4 is optically coupled to the waveguide 212_4. Accordingly, the portion of the CW signal in each of the waveguides 212 may be directed to and received by a corresponding one of the MZMs 207.

As previously mentioned, each of the MZMs 207 within each of the arms 205 may include an interferometer with two arms. Voltages may be applied to the arms of each of the MZMs 207. By choosing appropriate voltages for each arm within each of the MZMs 207, the portion of the CW signal within each of the MZMs 207 may be directed to a corresponding one of the outputs 208 or a corresponding one of the sensors 210 within each of the arms 205. By modulating the voltage in each arm of each of the MZMs 207 with data, each of the MZMs 207 then modulates its portion of the CW signal to generate a corresponding modulated optical data signal. Each of the MZMs 207 may generate a modulated optical data signal independent of the other MZMs 207, and four different resulting modulated optical data signals may be output from the PIC 201, e.g., via outputs 208.

The modulated optical data signals output from the outputs 208 of the PIC 201 may be coupled into a corresponding number of optical fibers for transmission through an optical network. For example, the modulated optical data signal output from the output 208_1 may be coupled into one optical fiber, the modulated optical data signal output from the output 208_2 may be coupled into another optical fiber, the modulated optical data signal output from the output 208_3 may be coupled into yet another optical fiber, and the modulated optical data signal output from the output 208_4 may be coupled into still another optical fiber.

Each of the sensors 210 may be configured to detect an optical power level, e.g., of the CW signal, of a portion of the CW signal, or of a corresponding one of the modulated optical data signals. For example, the sensor 210 nearest to the input 206_1 may detect an optical power level of the CW signal received through the input 206_1 into the waveguide 212_1 prior to the CW signal being split, while the sensor 210 in the arm 205_1 at an output of the MZM 207_1 may detect an optical power level of the modulated optical data signal output from the MZM 207_1.

If the detected optical power level is less than a threshold power level, it may be determined that the transmitting light source (e.g., the light source 202) is failing or has failed. The threshold power level used to make such a determination may depend on where the sensor 210 is located within the transmitter 200. For instance, the threshold power level at the sensors 210 nearest to the inputs 206 may be a first value, the threshold power level at the sensors 210 at the inputs to the arms 205 may be a second value (e.g., about a quarter of the first value), and/or the threshold power level at the sensors 210 at outputs of the MZMs 207 may be a third value (e.g., less than the second value).

Further, for example, upon determining that the light source 202 is failing or has failed, the light source 202 may be deactivated ("turned-off") and the light source 204 may be activated ("turned-on"). The light source 202 may be deactivated and the light source 204 may be activated substantially simultaneously, the light source 202 may be deactivated before the light source 204 is activated, or the light source 204 may be activated before the light source 202 is deactivated.

According to various embodiments, upon deactivation of a primary light source and activation of a redundant light source (e.g., in response to failure of a primary light source), a signal path for each of the modulated optical data signals output from the PIC 201 between the transmitter 200 and a receiver (e.g., a second transceiver coupled to the transmitter 200 via optical fibers) may be unchanged. Stated another way, regardless of a light source (e.g., laser 202 or laser 204), a signal may be routed via the same one or more channels. Further, in accordance with at least some embodiments, the sensing, deactivation, and/or activation operations of transmitter 200 may be performed in the DC domain, and high speed switching and routing may not be required. Further, according to various embodiments, on the receiver side (not shown in FIG. 2), there may not be any additional requirements.

Figure 3:
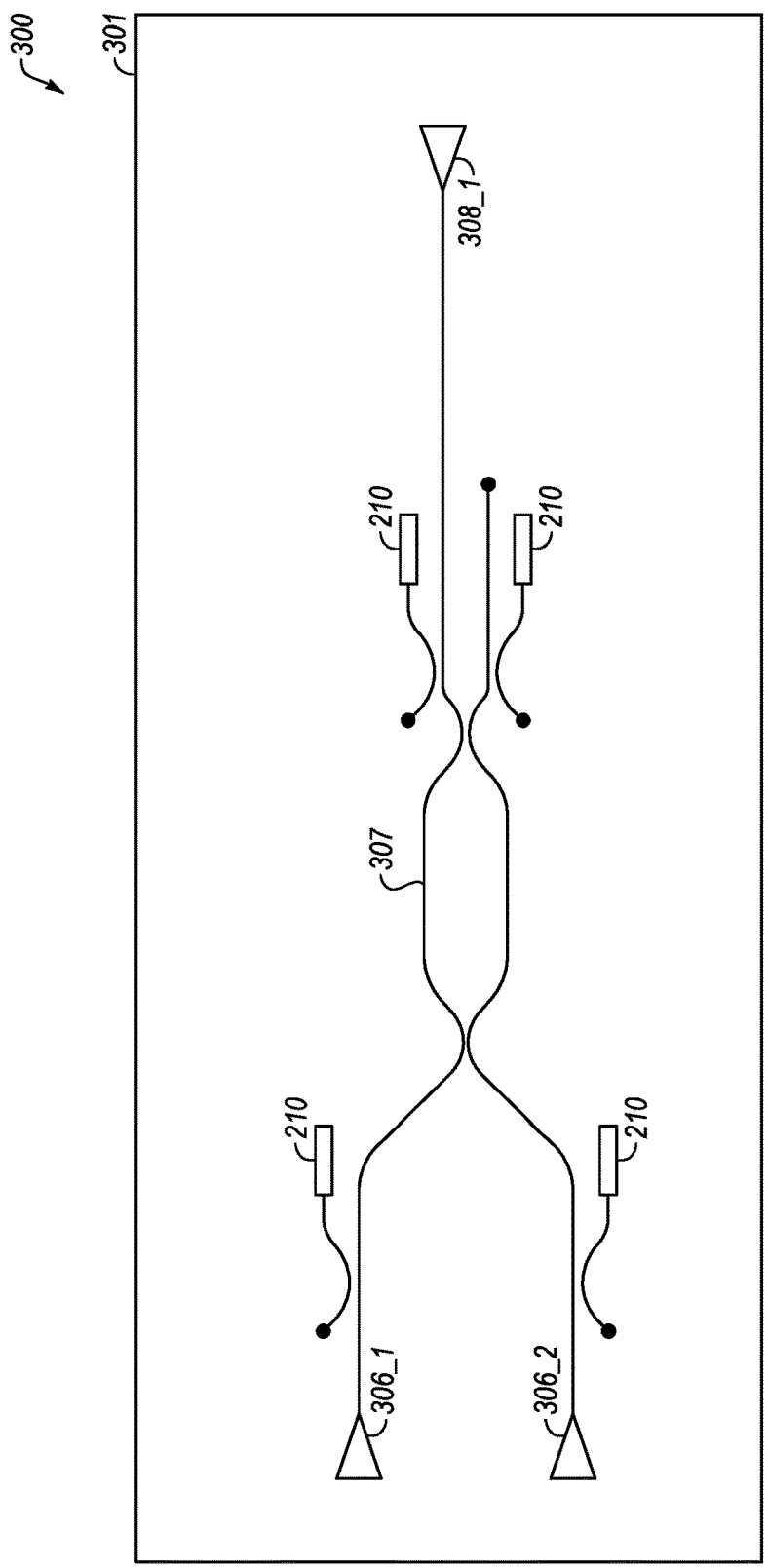
FIG. 3 illustrates another optical transmitter including a plurality of light sources, in accordance to one or more various embodiments of the present disclosure.

FIG. 3 depicts another optical transmitter 300 (hereinafter "transmitter 300") including a plurality of light sources, in accordance to one or more various embodiments of the present disclosure. In accordance with various embodiments, transmitter 300 may include one light source 302 (e.g., a CW laser) and a redundant light source 304 (e.g., another CW laser), which may improve the reliability of the transmitter 300. Further, for example, the transmitter 300 may be part of a single channel optical transceiver module with two light sources (e.g., two lasers).

As illustrated, the transmitter 300, which may include a PIC 301, includes the first light source (e.g., a primary laser) 302 and at least one additional light source (e.g., a backup laser) 304. The light sources 302 and 304 may include any suitable light sources, such as light emitting diodes or laser diodes. Moreover, the transmitter 300 includes inputs 306 (e.g., an input 306_1 associated with the light source 302 and an input 306_2 associated with the light source 304). In addition, the transmitter 300 includes modulators (e.g., MZM modulators) 307, sensors 210, and output 308_1.

In general operation, the light source 302 or the light source 304 may emit a CW signal, which is coupled into the PIC 301 via a corresponding one of the inputs 306_1, 306_2. The CW signal, rather than being split into multiple portions as in FIG. 2, is directed to the MZM 307, which modulates the CW signal to generate a modulated optical data signal as described with respect to FIG. 2. The modulated optical data signal may then be output from the PIC 301 via the output 308_1. In comparison to the transmitter 200 of FIG. 2, the transmitter 300 of FIG. 3 may output a single modulated optical data signal, rather than four modulated optical data signals.

In terms of redundancy, operation of the transmitter 300 of FIG. 3 may be similar or identical in many respects to operation of the transmitter 200 of FIG. 2. In particular, an optical power level of an optical signal (e.g., the CW signal or the modulated optical data signal propagating through various parts of the PIC 301) may be sensed via one or more sensors 210. Further, if the sensed optical power level is less than a threshold power level, it may be determined that the transmitting light source (e.g., light source 302) is failing or has failed. Further, for example, upon determining that light source 302 is failing or has failed, the light source 302 may be deactivated ("turned-off") and the light source 304 may be activated ("turned-on"). The light source 302 may be deactivated and the light source 304 may be activated substantially simultaneously, the light source 302 may be deactivated before the light source 304 is activated, or the light source 304 may be activated before the light source 302 is deactivated.

According to various embodiments, upon deactivation of light source 302 and activation of the redundant light source 304 (e.g., in response to failure of light source 302), a signal path may be unchanged. Stated another way, regardless of a light source (e.g., light source 302 or light source 304), a signal may be routed via the same one or more channels. Further, in accordance with at least some embodiments, the sensing, deactivation, and/or activation operations of transmitter 300 may be performed in the DC domain, and high speed switching and routing may not be required. Further, according to various embodiments, on a receive side (e.g., a receiver associated with transmitter 300; not shown in FIG. 3), there may not be any additional requirements.

Figure 4:
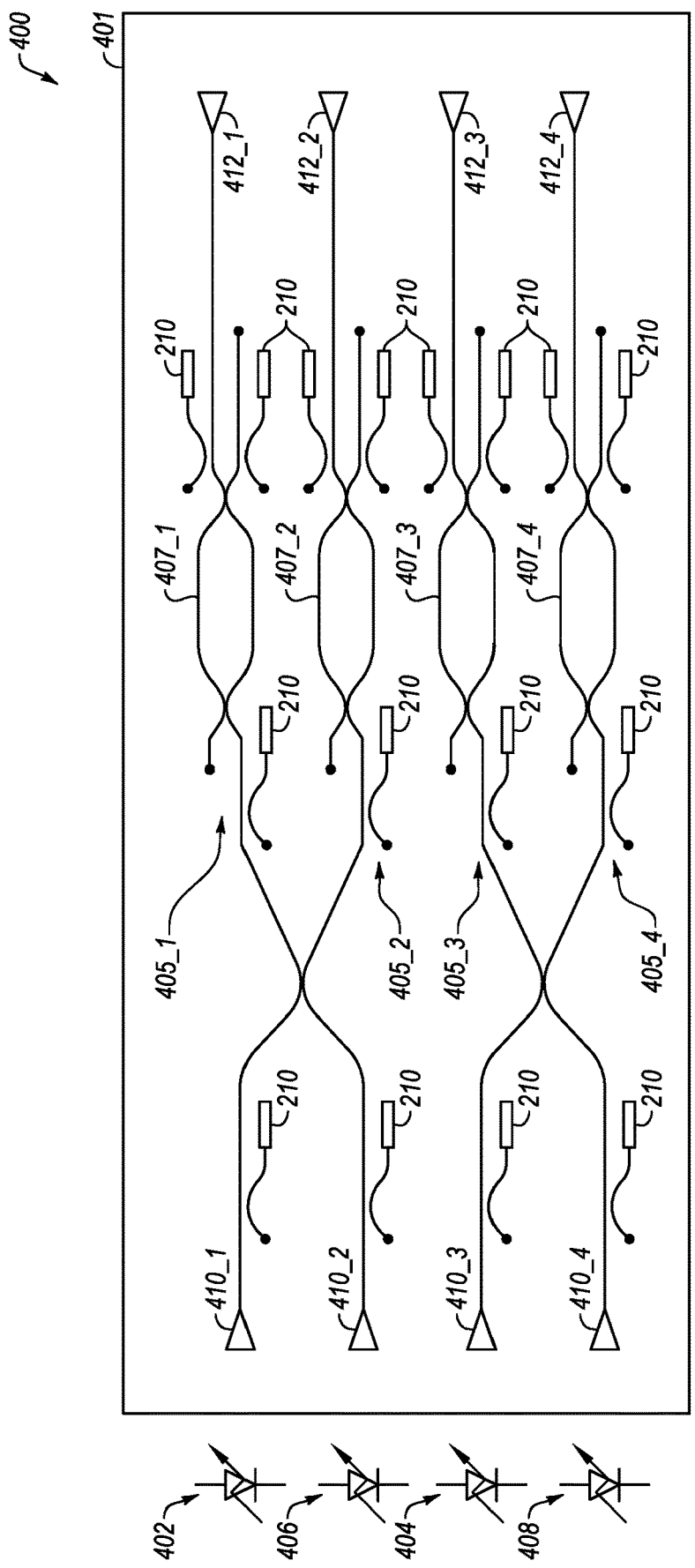
FIG. 4 depicts yet another optical transmitter including a plurality of light sources, according to various embodiments of the present disclosure.

FIG. 4 illustrates yet another optical transmitter 400 (hereinafter "transmitter 400") including a plurality of light sources, according to various embodiments of the present disclosure. In accordance with various embodiments, the transmitter 400 may include a plurality of primary light sources (e.g., CW lasers) and a plurality of redundant light source (e.g., CW lasers), which may improve the reliability of transmitter 400. Further, for example, the transmitter 400 may be part of a four channel parallel optical transceiver module with four light sources (e.g., four lasers).

As illustrated, the transmitter 400, which may include a PIC 401, includes a first light source (e.g., a first primary laser) 402, a second light source (e.g., a second primary laser) 404, a third light source (e.g., a first backup laser) 406, and a fourth light source (e.g., a second backup laser) 408. Light sources 402, 404, 406, and 408 may include any suitable light sources, such as light emitting diodes and/or laser diodes. According to some embodiments, each of the light sources 402, 404, 406, and 408 may be configured to emit a CW signal.

The transmitter 400 further includes inputs 410 (e.g., input 410_1 associated with the light source 402, input 410_2 associated with the light source 406, input 410_3 associated with the light source 404, and input 410_4 associated with the light source 408). In addition, the transmitter 400 includes modulators (e.g., MZM modulators) 407, sensors 210, and outputs 412_1, 412_2, 412_3, and 412_4 (collectively "outputs 412").

In general operation, the light source 402 or the light source 406 may emit a CW signal, which is coupled into the PIC 401 via a corresponding one of the inputs 410_1, 410_2.

The CW signal received from the light source 402 or the light source 406 is split into two portions, each of which is directed to a different one of two arms 405_1, 405_2, where each of the arms 405_1, 405_2 includes a corresponding one of the MZMs 407_1, 407_2. Each of the MZMs 407_1, 407_2 modulates its portion of the CW signal to generate a corresponding modulated optical data signal as described with respect to FIG. 2. The resulting two modulated optical data signals may then be output from the PIC 401 via a corresponding one of the outputs 412_1, 412_2.

Analogously, the light source 404 or the light source 408 may emit a CW signal, which is coupled into the PIC 401 via a corresponding one of the inputs 410_3, 410_4. The CW signal received from the light source 404 or the light source 408 is split into two portions, each of which is directed to a different one of two arms 405_3, 405_4, where each of the arms 405_3, 405_4 includes a corresponding one of the MZMs 407_3, 407_4. Each of the MZMs 407_3, 407_4 modulates its portion of the CW signal to generate a corresponding modulated optical data signal as described with respect to FIG. 2. The resulting two modulated optical data signals may then be output from the PIC 401 via a corresponding one of the outputs 412_3, 412_4. Accordingly, the PIC 401 may output a total of four modulated optical data signals in this example.

In terms of redundancy, operation of the transmitter 400 of FIG. 4 may be similar or identical in many respects to operation of the transmitter 200 of FIG. 2. In particular, an optical power level of an optical signal (e.g., one or more of the CW signals, portions thereof, or the modulated optical data signals) may be sensed via one or more sensors 210. Further, if the sensed optical power level is less than a threshold power level, it may be determined that the transmitting light source (e.g., the light source 402) is failing or has failed. Further, for example, in response to determining that the light source 402 has failed or is failing, the light source 402 may be deactivated ("turned-off") and the light source ("secondary laser") 406 may be activated ("turned-on"). The light source 402 may be deactivated and the light source 406 may activated substantially simultaneously, the light source 402 may be deactivated before the light source 406 is activated, or the light source 406 may be activated before the light source 402 is deactivated.

Further, upon determining that the light source 404 has failed or is failing (e.g., via sensing (e.g., with one or more sensors 210) an optical power level of a signal transmitted by the light source 404), the light source 404 may be deactivated ("turned-off") and the light source 408 may be activated ("turned-on"). The light source 404 may be deactivated and the light source 408 may activated substantially simultaneously, the light source 404 may be deactivated before the light source 408 is activated, or the light source 408 may be activated before the light source 404 is deactivated.

According to various embodiments, upon deactivation of a primary light source and activation of a redundant light source (e.g., in response to failure of the primary light source), a signal path may be unchanged. Stated another way, regardless of a light source (e.g., light source 402 or light source 406, or light source 404 and light source 408), a signal may be routed via the same one or more channels between transceivers and/or between a transmitter and a receiver. In accordance with at least some embodiments, the sensing, deactivation, and/or activation operations of the transmitter 400 may be performed in the DC domain, and high speed switching and routing may not be required. Further, according to various embodiments, on a receive side (e.g., a receiver associated with transmitter 400; not shown in FIG. 4), there may not be any additional requirements.

Figure 5:
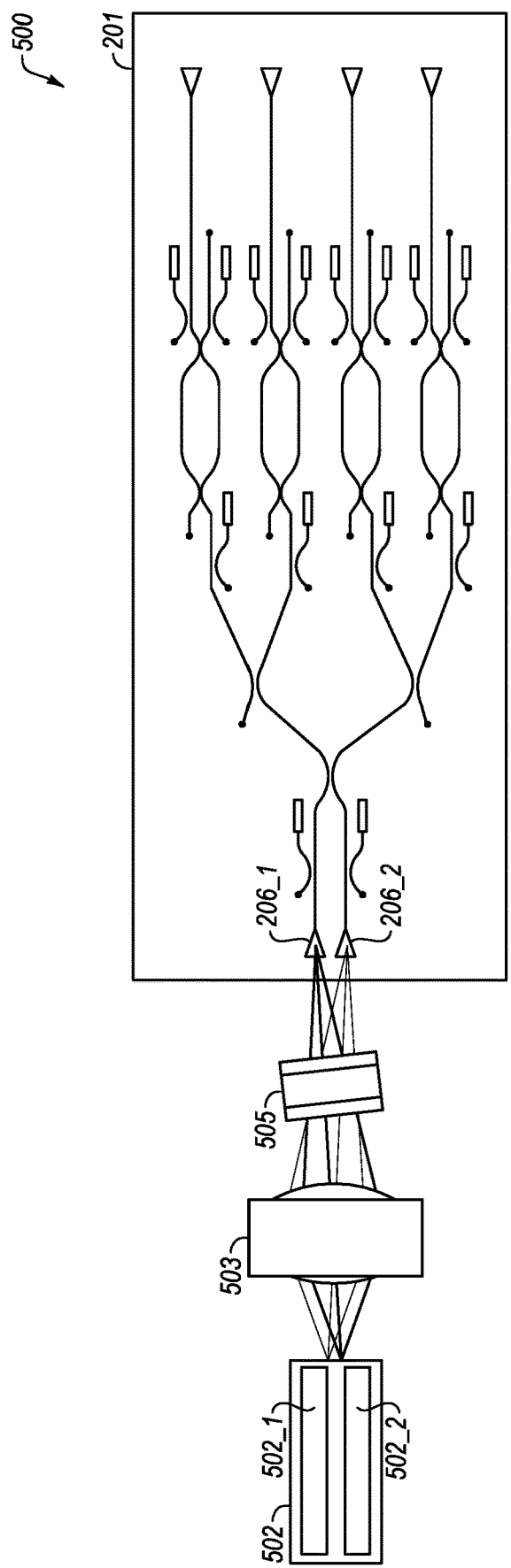
FIG. 5 illustrates an optical transmitter including a dual stripe light source, in accordance to one or more various embodiments of the present disclosure.

FIG. 5 illustrates another optical transmitter 500 (hereinafter "transmitter 500"), according to at least one embodiment of the present disclosure. The transmitter 500, which may include the PIC 201 of FIG. 2, further includes a dual stripe light source 502, a lens 503 (e.g., laser coupling lens), and an optical isolator 505. The dual stripe light source 502 includes two light source 502_1 and 502_2, which may be physically separated by, for example a few microns. The light sources 502_1 and 502_2 may include any suitable light sources, such as light emitting diodes and/or laser diodes, and may respectively include or correspond to the lights sources 202 and 204 of FIG. 2. The dual stripe light source 502 may include a single chip with two lasers, e.g., light sources 502_1, 502_2, formed thereon.

Further, as configured, the lens 503 and the optical isolator 505 may be shared by the light sources 502_1 and 502_2, and, thus costs associated with fabrication and/or use of the transmitter 500 may be reduced (e.g., as compared to a transmitter and/or transceiver including two or more light sources that do not share components).

Although the transmitter 500 is depicted as including a dual light source (e.g., the dual stripe light source 502) and a 4-channel PIC (e.g., the PIC 201), the present disclosure is not so limited. For instance, the transmitter 500 may alternatively or additionally include two discrete light sources that share one or more of the lens 503 and the optical isolator 505, multiple (e.g., two or more) dual light sources rather than just one as depicted in FIG. 5, or other PICs such as the PIC 301 of FIG. 3 or the PIC 401 of FIG. 4.

The dual stripe light source 502, the lens 503, the optical isolator 505, and the inputs 206_1, 206_2 may be configured such that a CW signal emitted by the light source 502_1 may be focused by the lens 503 through the optical isolator 505 into the input 206_1, while a CW signal emitted by the light source 502_2 may be focused by the lens 503 through the optical isolator 505 into the input 206_2. Operation of the transmitter 500 may otherwise be the same or similar to operation of the transmitter 200 of FIG. 2 and will not be repeated here.

Figure 6:
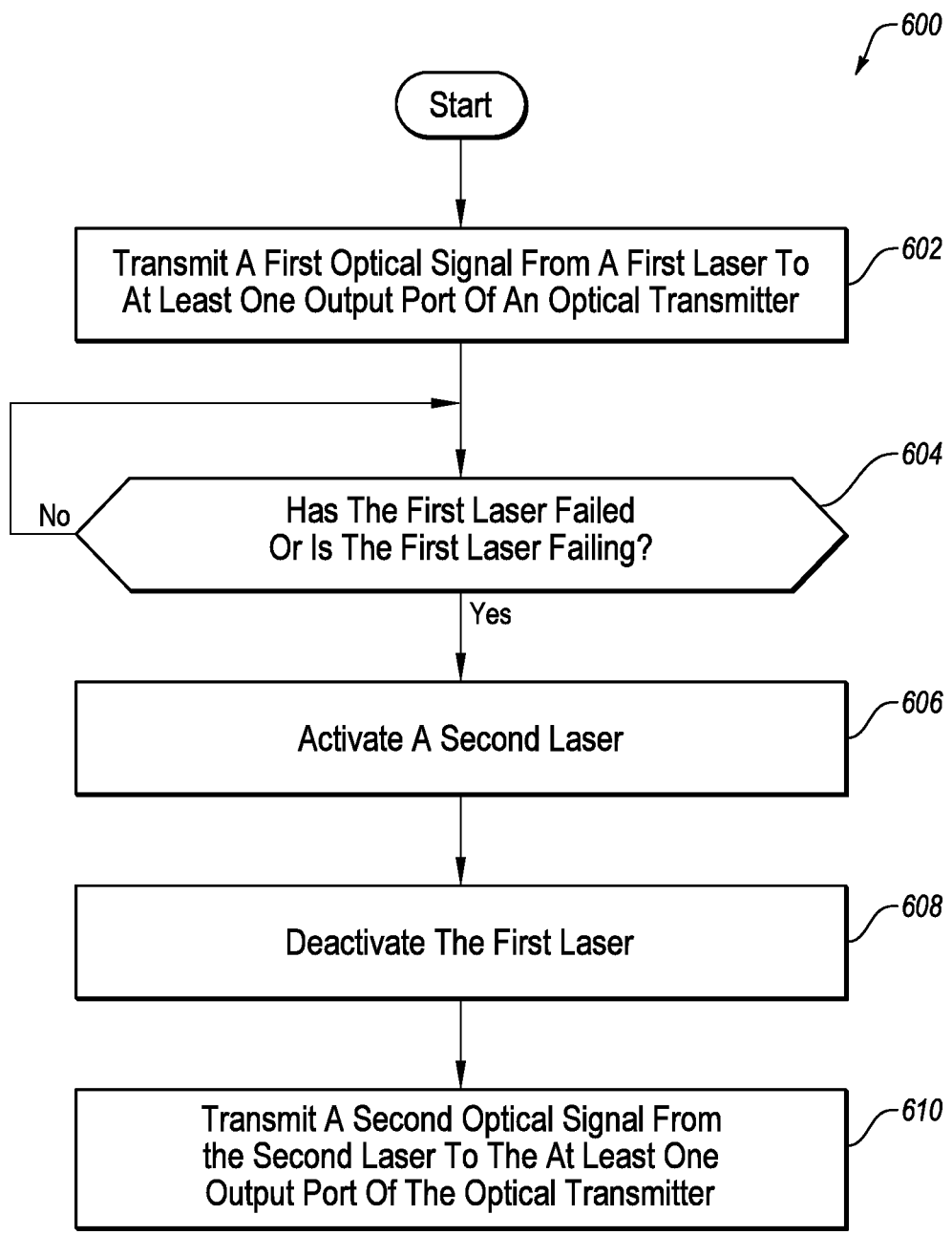
FIG. 6 is a flowchart of an example method for operating an optical transmitter, according to various embodiments of the present disclosure.

FIG. 6 is a flowchart of an example method 600 to operate an optical transmitter, arranged in accordance with at least one embodiment described herein. The method 600 may be performed by any suitable system, apparatus, or device. For example, the transmitter 200, 300, 400, 500 and/or an optical transceiver module 700 (see FIGS. 2-5 and 7) or one or more of the components thereof may perform and/or control performance of one or more of the operations associated with the method 600. In these and other embodiments, program instructions stored on a computer readable medium may be executed to perform and/or control performance of one or more of the operations of the method 600.

At block 602, an optical signal may be transmitted from a first light source to at least one output of an optical transmitter, and the method 600 may proceed to block 604. The optical transmitter may include, for example, an N-channel optical transmitter, wherein N is any positive integer. Further, for example, the optical signal may be transmitted from a first light source, which may include a primary light source (e.g., the light source 202 of FIG. 2, the light source 302 of FIG. 3, the light source 402 of FIG. 4, the light source 404 of FIG. 4, or the light source 502_1 of FIG. 5), to the at least one output of the optical transmitter (e.g., the transmitter 200 of FIG. 2, the transmitter 300 of FIG. 3, the transmitter 400 of FIG. 4, or the transmitter 500 of FIG. 5).

At block 604, it may be determined whether the first light source has failed or is failing. If it is determined that the first light source has failed or is failing, the method 600 may proceed to block 606. If it is determined that the first light has not failed and is not failing, the method 600 may return to block 604.

For example, a sensor, such as a photodiode (e.g., on a PIC such as any of the PICs 201, 301, 401 discussed herein) may sense an optical power level of the optical signal transmitted via the first light source. If the optical power level is below a threshold level, it may be determined that the first laser is failing and/or has failed. According to various embodiments, one or more sensors 210 (see, e.g., FIGS. 2-5) may sense, in the DC domain, the optical power level of the optical signal transmitted via the first light source.

At block 606, a second light source may be activated, and the method 600 may proceed to block 608. For example, the second light source, which may include a backup light source (e.g., the light source 204 of FIG. 2, the light source 304 of FIG. 3, the light source 406 of FIG. 4, the light source 408 of FIG. 4, or the light source 502_2 of FIG. 5), may be activated (e.g., in the DC domain).

At block 608, the first light source may be deactivated, and the method 600 may proceed to block 610. For example, the first light source may be deactivated in the DC domain.

At block 610, an optical signal may be transmitted from the second light source to the at least one output of the optical transmitter. For example, the optical signal may be transmitted from the second light source to the at least one output of the optical transmitter (e.g., the transmitter 200 of FIG. 2, the transmitter 300 of FIG. 3, the transmitter 400 of FIG. 4, or the transmitter 500 of FIG. 5). According to some embodiments, the channel in which the optical signal from the first light source is transmitted, e.g., from the optical transmitter across an optical fiber as a channel to an optical receiver, may be the same channel in which the optical signal from the second light source is transmitted.

Modifications, additions, or omissions may be made to the method 600 without departing from the scope of the present disclosure. For example, the operations of the method 600 may be implemented in differing order. More specifically, for example, the first light source may be deactivated before the second light source is activated, or the first light source may be deactivated and the second light source may be activated substantially simultaneously. Furthermore, the outlined operations and actions are only provided as examples, and some of the operations and actions may be optional, combined into fewer operations and actions, or expanded into additional operations and actions without detracting from the essence of the disclosed embodiments.

Figure 7:
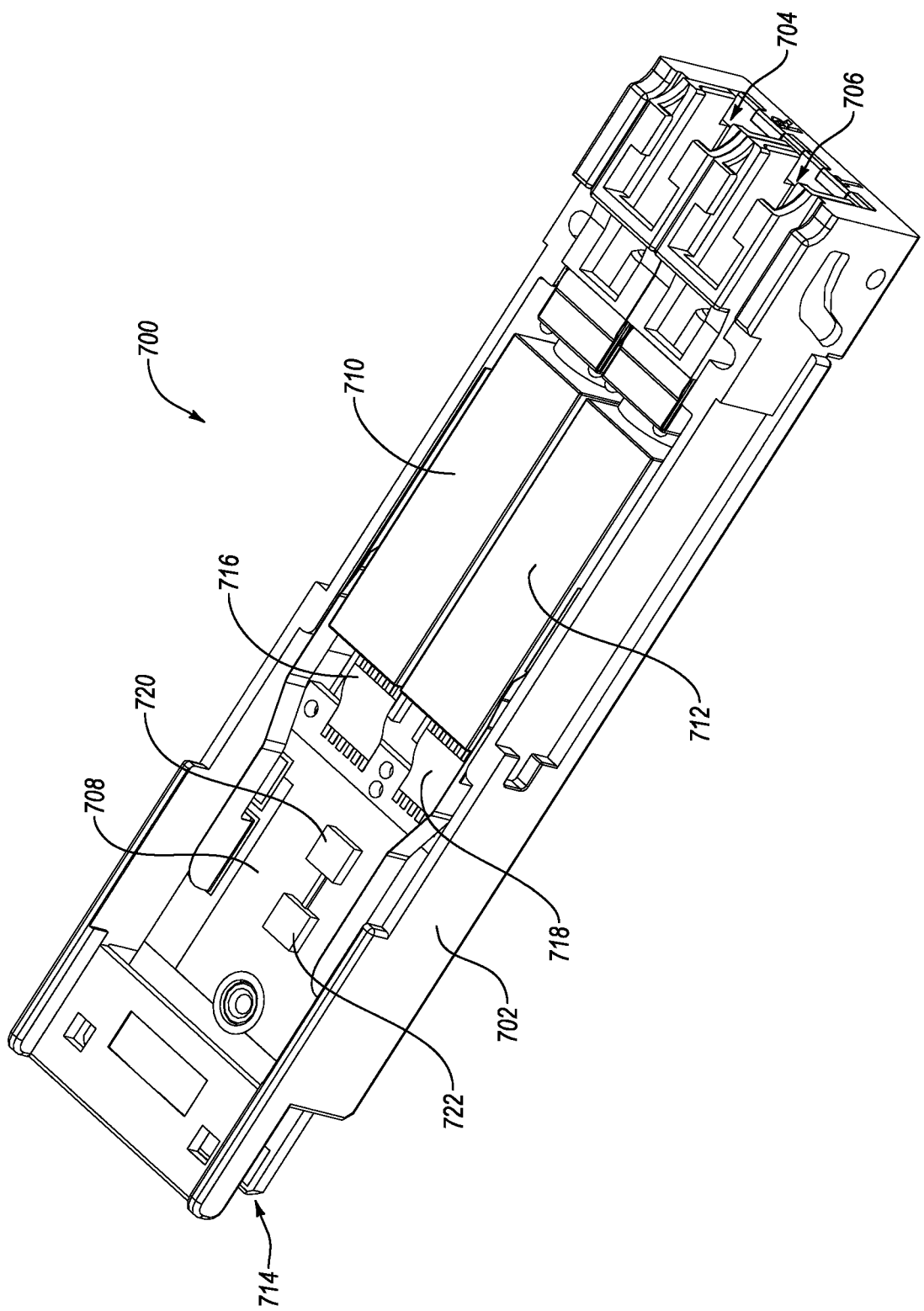
FIG. 7 is a block diagram of a system including an optical transceiver, in accordance with an embodiment of the present disclosure.

FIG. 7 illustrates an example optoelectronic module 700 (hereinafter "module 700"), arranged in accordance with at least some embodiments described herein. The module 700 may be configured for use in transmitting and receiving optical signals in connection with a host device (not shown).

As illustrated, the module 700 may include a bottom housing 702, a receive port 704, and a transmit port 706. The module 700 further includes a PCB 708 positioned within the bottom housing 702. The PCB 708 includes integrated circuits 720, 722 positioned thereon. In addition, the module 700 includes a ROSA 710 and a TOSA 712 also positioned within the bottom housing 702. An edge connector 714 may be located on an end of the PCB 708 to enable the module 700 to electrically interface with a host device. As such, the PCB 708 may facilitate electrical communication between the host device and the ROSA 710 and between the host device and the TOSA 712. Although not illustrated in FIG. 7, the module 700 may additionally include a top housing that cooperates with the bottom housing 702 to at least partially enclose one or more of the other components of the module 700.

The module 700 may be configured for optical signal transmission and reception at a variety of data rates including, but not limited to, 1 Gb/s, 10 Gb/s, 20 Gb/s, 40 Gb/s, 100 Gb/s, or higher. Furthermore, the module 700 may be configured for optical signal transmission and reception at various distinct wavelengths using wavelength division multiplexing (WDM) using one of various WDM schemes, such as Coarse WDM, Dense WDM, or Light WDM. Furthermore, the module 700 may be configured to support various communication protocols including, but not limited to, Fibre Channel and High Speed Ethernet. In addition, although illustrated in a particular form factor in FIG. 7, more generally, the module 700 may be configured in any of a variety of different form factors including, but not limited to, the Small Form-factor Pluggable (SFP), the enhanced Small Form-factor Pluggable (SFP+), the 10 Gigabit Small Form Factor Pluggable (XFP), the C Form-factor Pluggable (CFP) and the Quad Small Form-factor Pluggable (QSFP) multi-source agreements (MSAs).

The ROSA 710 may house one or more optical receivers that are electrically coupled to an electrical interface 716. The one or more optical receivers may be configured to convert optical signals received through the receive port 704 into corresponding current electrical signals that are relayed to the integrated circuit 720 through the electrical interface 716 and the PCB 708.

The TOSA 12 may house one or more optical transmitters (e.g., including one or more of optical transmitter 200, 300, 400, and 500; see FIGS. 2-5) that are electrically coupled to another electrical interface 718. The one or more optical transmitters, which may include one or more primary light sources and one or more redundant light sources, may be configured to convert electrical signals received from a host device by way of the PCB 708 and the electrical interface 718 into corresponding optical signals that are transmitted through the transmit port 706.

The integrated circuit 720 may be configured to convert the current electrical signals to voltage electrical signals and to equalize the voltage electrical signals. The integrated circuit 720 may drive the equalized voltage electrical signals to a second integrated circuit 722. In some embodiments, the second integrated circuit 722 may be a CDR circuit. In some embodiments, an integrated circuit may be incorporated into the ROSA 5710 and may be used to convert current electrical signals to equalized voltage electrical signals. Modifications, additions, or omissions may be made to the module 700 without departing from the scope of the present disclosure.

The module 700 illustrated in FIG. 7 is one architecture in which embodiments of the present disclosure may be employed. This specific architecture is only one of countless architectures in which embodiments may be employed. The scope of the present disclosure is not intended to be limited to any particular architecture or environment.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An optical transmitter, comprising:
   a dual strip light source that includes:
      a primary laser to transmit a primary continuous wave (CW) signal; and
      a backup laser to transmit a backup CW signal;
   a lens coupled to the dual stripe light source;
   a photonic integrated circuit (PIC) that includes:
      a first input port configured to receive the primary CW signal from the primary laser;
      a second input port configured to receive the backup CW signal from the backup laser;
      a Mach-Zehnder optical modulator (MZM) having a first input coupled to the first input port and a second input coupled the second input port and configured to modulate at least a portion of the primary CW signal or at least a portion of the backup CW signal to generate a modulated optical data signal; and
      an output port configured output the modulated optical data signal from the PIC; and
   an optical isolator coupled between the lens and the PIC;
   wherein the optical transmitter is configured to activate the backup laser in response to determining that the primary laser has failed or is failing.

2. The optical transmitter of claim 1, the PIC further comprising at least one sensor to sense a power level of the primary CW signal to determine whether the primary laser has failed or is failing.

3. The optical transmitter of claim 2, wherein the at least one sensor comprises at least one photodiode.

4. The optical transmitter of claim 1, further comprising:
   a second primary laser to transmit a second primary CW signal; and
   a second backup laser to transmit a second backup CW signal;
   wherein the PIC further includes:
      a third input port configured to receive the second primary CW signal from the second primary laser;
      a fourth input port configured to receive the second backup CW signal from the second backup laser;
      a second MZM coupled to both the third input port and the fourth input port and configured to modulate at least a portion of the second primary CW signal or at least a portion of the second backup CW signal to generate a second modulated optical data signal; and
      a second output port configured to output the second modulated optical data signal from the PIC;
   wherein the optical transmitter is configured to activate the second backup laser in response to determining that the second primary laser has failed or is failing.

5. The optical transmitter of claim 1, wherein the optical transmitter comprises an N-channel optical transmitter, wherein N is a positive integer.

6. An optical transmitter, comprising:
   a dual stripe light source that includes a first laser and a second laser; and
   a photonic integrated circuit (PIC) that includes a first input port, a second input port, a Mach-Zehnder optical modulator (MZM) having first and second inputs respectively coupled to the first input port and the second input port, and an output port coupled to an output of thr MZM;
   wherein:
      the first input port is configured to receive a first continuous wave (CW) signal from the first laser;
      the second input port is configured to receive a second CW signal from the second laser;
      the MZM is configured to modulate at least a portion the first CW signal when the first laser is activated or at least a portion of the second CW signal when the second laser is activated to generate a modulated optical data signal;
      the output port is configured to output the modulated optical data signal from the PIC; and
      the optical transmitter is configured to:
         sense an optical power level of the first CW signal; and
         activate the second laser in response to the optical power level of the first CW signal being below a threshold value.

7. The optical transmitter of claim 6, further comprising at least one sensor configured to sense the optical power level of the first CW signal.

8. The optical transmitter of claim 6, wherein the PIC further includes:
   a third input port configured to receive a third CW signal from a third laser;
   a fourth input port configured to receive a fourth CW signal from a fourth laser; and
   a second MZM coupled to both of the third and fourth input ports and configured to modulate at least a portion of the third CW signal when the third laser is activated or at least a portion of the fourth CW signal when the fourth laser is activated to generate a second modulated optical data signal.

9. The optical transmitter of claim 8, wherein the optical transmitter is further configured to:
   sense an optical power level of the third CW signal; and
   activate the fourth laser in response to the optical power level of the third CW signal being below the threshold value.

10. The optical transmitter of claim 6, wherein the optical transmitter is further configured to deactivate the first laser in response to the optical power level of the first CW signal being below a threshold value.

11. The optical transmitter of claim 6, wherein the optical transmitter is configured to determine that the first laser is failing or has failed if the optical power level of the first CW signal is below the threshold value.

12. A method, comprising:
   transmitting, from a first laser of a dual stripe light source, a first continuous wave (CW) signal through a lens and an optical isolator to a photonic integrated circuit (PIC);
   routing at least a portion of the first CW signal within the PIC to a first input of a Mach-Zehnder optical modulator (MZM) formed in the PIC;
   modulating the at least the portion of the first CW signal in the MZM to generate a modulated optical data signal;
   determining whether the first laser has failed or is failing;
   activating a second laser of the dual stripe light source in response to determining that the first laser has failed or is failing;
   deactivating the first laser in response to determining that the first laser has failed or is failing;
   transmitting, from the second laser, a second CW signal through the lens and the optical isolator to the PIC;
   routing at least a portion of the second CW signal within the PIC to a second input of the MZM; and
   modulating the at least the portion of the second CW signal in the MZM to generate the modulated optical data signal.

13. The method of claim 12, wherein determining whether the first laser has failed or is failing comprises sensing a power level of the first CW signal via at least one photodiode to determine if the first laser has failed or is failing.

14. The method of claim 12, further comprising:
- transmitting, from a third laser, a third CW signal through the lens and the optical isolator to the PIC;
- routing at least a portion of the third CW signal within the PIC to a second MZM formed in the PIC;
- modulating the at least the portion of the third CW signal in the second MZM to generate a second modulated optical data signal;
- determining whether the third laser has failed or is failing;
- activating a fourth laser in response to determining that the third laser has failed or is failing;
- deactivating the third laser in response to determining that the third laser has failed or is failing;
- transmitting, from the fourth laser, a fourth CW signal through the lens and the optical isolator to the PIC;
- routing at least a portion of the fourth CW signal within the PIC to the second MZM; and
- modulating the at least the portion of the fourth CS signal in the MZM to generate the second modulated optical data signal.

15. The method of claim 14, wherein determining whether the third laser has failed or is failing comprises sensing a power level of the third CW signal via at least one photodiode to determine if the third laser has failed or is failing.

* * * * *